United States Patent
Cho et al.

(10) Patent No.: US 8,085,375 B2
(45) Date of Patent: Dec. 27, 2011

(54) LIQUID CRYSTAL DISPLAY AND METHOD OF MANUFACTURING THE SAME

(75) Inventors: Yong-Seok Cho, Seoul (KR); Won-Sang Park, Yongin-si (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 391 days.

(21) Appl. No.: 12/411,118

(22) Filed: Mar. 25, 2009

(65) Prior Publication Data

US 2009/0284707 A1   Nov. 19, 2009

(30) Foreign Application Priority Data

May 14, 2008   (KR) .......................... 10-2008-0044597

(51) Int. Cl.
G02F 1/1343   (2006.01)
G02F 1/1337   (2006.01)
G02F 1/1368   (2006.01)
G09G 3/36   (2006.01)

(52) U.S. Cl. ............................ 349/129; 257/59; 349/141

(58) Field of Classification Search .................. 349/141, 349/160, 187, 143, 54, 38, 43, 129, 144; 257/59, E27.131; 345/98
See application file for complete search history.

(56) References Cited

U.S. PATENT DOCUMENTS

| | | | |
|---|---|---|---|
| 6,567,144 B1* | 5/2003 | Kim et al. | 349/128 |
| 6,570,636 B2* | 5/2003 | Kim et al. | 349/130 |
| 6,710,837 B1* | 3/2004 | Song et al. | 349/143 |
| 6,721,028 B2* | 4/2004 | Kim et al. | 349/141 |
| 6,829,028 B2* | 12/2004 | Lai et al. | 349/130 |
| 6,924,863 B2* | 8/2005 | Nishida et al. | 349/141 |
| 6,933,916 B2* | 8/2005 | Nakao et al. | 345/98 |
| 7,087,929 B2* | 8/2006 | Maeda | 257/59 |
| 7,167,225 B2* | 1/2007 | Kim | 349/139 |
| 7,633,595 B2* | 12/2009 | Kim et al. | 349/156 |
| 8,018,541 B2* | 9/2011 | Lee et al. | 349/38 |
| 2001/0046020 A1* | 11/2001 | Cho | 349/141 |
| 2004/0070715 A1* | 4/2004 | Ma et al. | 349/130 |
| 2008/0002071 A1* | 1/2008 | Park | 349/33 |
| 2008/0143911 A1* | 6/2008 | Jin et al. | 349/48 |

FOREIGN PATENT DOCUMENTS

| | | |
|---|---|---|
| JP | 2007-171740 | 7/2007 |
| KR | 10-0301034 | 6/2001 |
| KR | 10-0720421 | 1/2004 |

(Continued)

OTHER PUBLICATIONS

English Abstract for Publication No. 10-0301034, Dated Jun. 21, 2001.

(Continued)

*Primary Examiner* — Akm Ullah
(74) *Attorney, Agent, or Firm* — F. Chau & Associates, LLC

(57) ABSTRACT

A liquid crystal display includes a first substrate, a second substrate, a liquid crystal material interposed between the first and second substrates. The liquid crystal display includes first protrusions and second protrusions that are alternately disposed with each other on the first substrate. A common electrode is provided at a side part of the first protrusions, and a pixel electrode is provided at a side part of the second protrusions to face the common electrode. A lateral electric field is generated between the common electrode and the pixel electrode facing each other for controlling an alignment of molecules of the liquid crystal material.

19 Claims, 10 Drawing Sheets

FOREIGN PATENT DOCUMENTS

KR    2007-178907    7/2007

OTHER PUBLICATIONS

English Abstract for Publication No. 102004006663 (for 10-0720421), Dated Jan. 24, 2004.

English Abstract for Publication No. 2007-171740, Dated Jul. 6, 2004.

English Abstract for Publication No. 2007-178907, Dated Jul. 12, 2007.

* cited by examiner

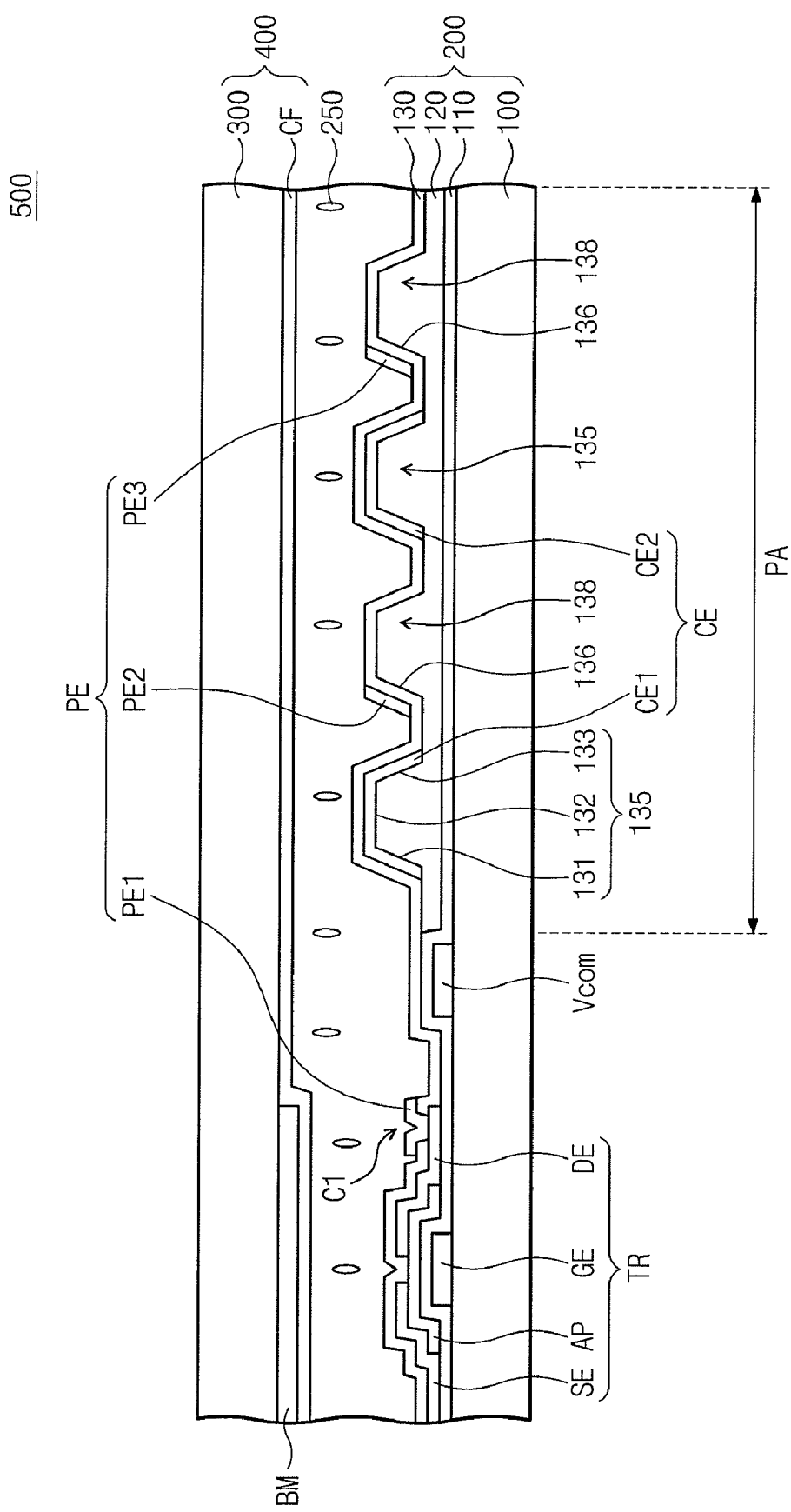

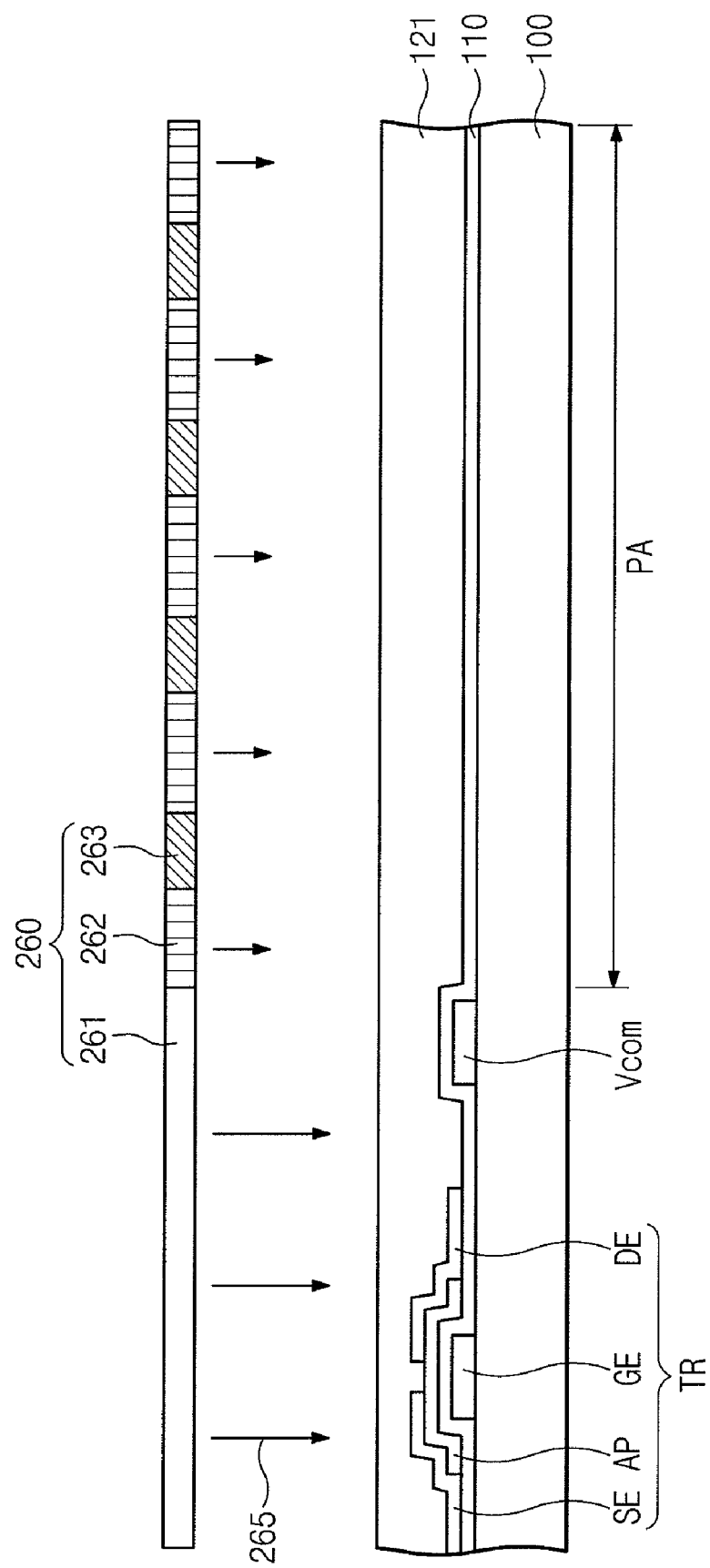

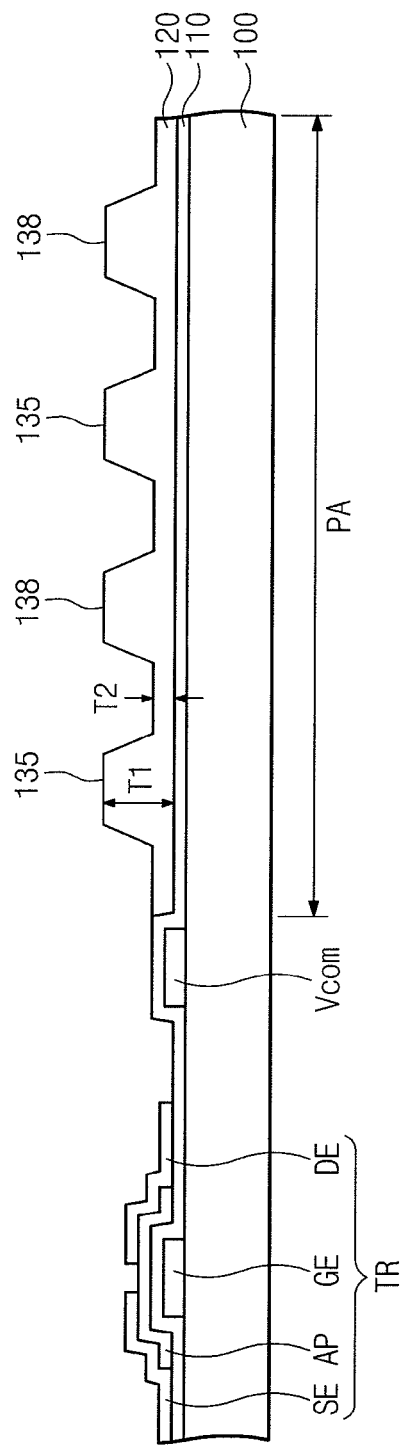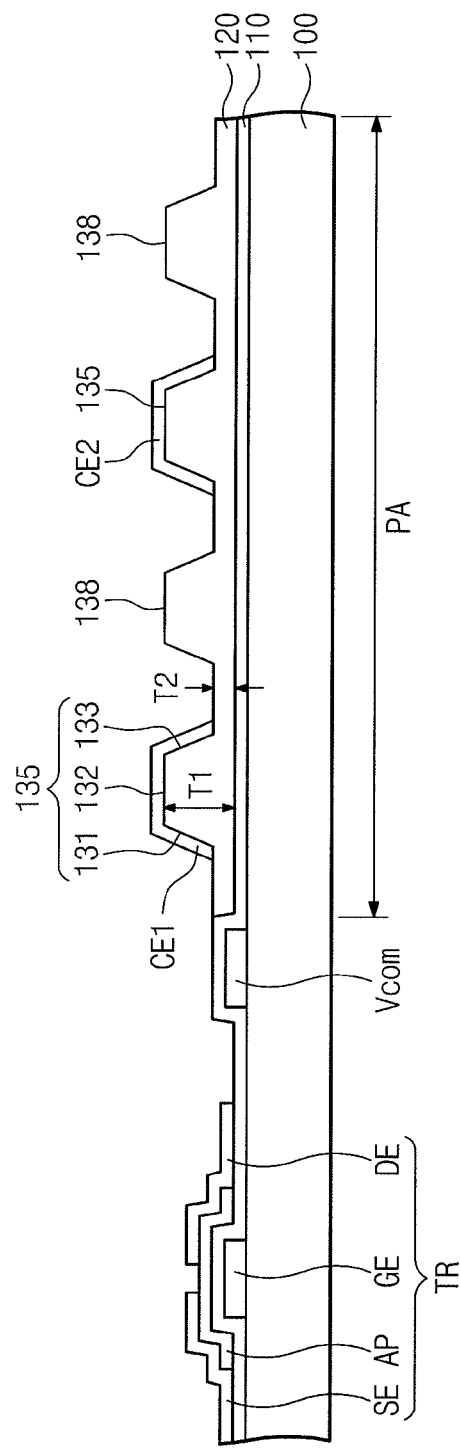

LIQUID CRYSTAL DISPLAY AND METHOD OF MANUFACTURING THE SAME

CROSS-REFERENCE TO RELATED APPLICATION

This application relies for priority upon Korean Patent Application No. 2008-44597 filed on May 14, 2008, the contents of which are herein incorporated by reference in their entirety.

BACKGROUND

1. Field of the Invention

The present invention relates to a liquid crystal display and a method of manufacturing the same. More particularly, the present invention relates to a liquid crystal display capable having improved display quality and a method of manufacturing the same.

2. Description of Related Art

A liquid crystal display includes a first substrate, a second substrate facing the first substrate and a liquid crystal material interposed between the first and second substrates. In addition, the liquid crystal display further includes a first electrode and a second electrode that generate an electric field to control alignment of molecules of the liquid crystal material. A driving method of the liquid crystal display varies depending on the position of the first electrode and the second electrode.

Typically, the first electrode is provided on the first substrate, and the second electrode is provided on the second substrate. The first and second electrodes generate an electric field between the first substrate and the second substrate to control the alignment of the liquid crystal molecules. Otherwise, the first electrode is provided on one of the first substrate and the second substrate together with the second electrode.

An IPS (In-plane switching) mode liquid crystal display, an FFS (Fringe Field Switching) mode liquid crystal display and a PLS (Plane-to-Line Switching) mode liquid crystal display are representative examples of the liquid crystal displays, in which the first electrode and the second electrode are provided on a single substrate.

When the first electrode is provided together with the second electrode on the single substrate, lateral electric fields spreading symmetrically with same intensity are formed adjacent to each other. In this case, since the directions of the lateral electric fields are symmetrical to each other, alignment of the liquid crystals can vary at a boundary between the adjacent lateral electric fields. Accordingly, light leakage occurs in the liquid crystal display.

SUMMARY

In an exemplary embodiment of the present invention, a liquid crystal display includes a first substrate, a second substrate, and a liquid crystal material. The second substrate faces the first substrate. The liquid crystal material is interposed between the first and second substrates.

The liquid crystal display may include at least one first protrusion, at least one second protrusion, a common electrode and a pixel electrode. The first protrusion may be provided on the first substrate. The second protrusion may be provided on the first substrate, alternating with the first protrusion. The common electrode may be provided at a first side part of the first protrusion. The pixel electrode may be provided at a second side part of the second protrusion that faces the first side part.

In another exemplary embodiment of the present invention, a method of manufacturing a liquid crystal display includes forming at least one first protrusion and forming at least one second protrusion alternating with the first protrusion. A common electrode is formed at a first side of the first protrusion. A pixel electrode is formed at a second side of the second protrusion, which faces the first side.

After the first substrate has been manufactured, the first substrate may be coupled to the second substrate. The liquid crystal material is formed between the first substrate and the second substrate.

A pixel electrode and a common electrode may be formed on a single substrate while facing each other, so that a lateral electric field substantially parallel to the substrate is formed between the pixel electrode and the common electrode. In addition, although the lateral electric field includes a first electric field and a second electric field having directions different from each other, intensity of the first electric field is different from that of the second electric field.

BRIEF DESCRIPTION OF THE DRAWINGS

Embodiments of the present invention will become readily apparent by reference to the following detailed description when considered in conjunction with the accompanying drawings wherein:

FIG. 2 is a sectional view taken along line I-I' shown in FIG. 1;

FIGS. 6 to 11 are views representing a process of manufacturing the liquid crystal display shown in FIG. 1.

DESCRIPTION OF EXEMPLARY EMBODIMENTS

Figure 1:
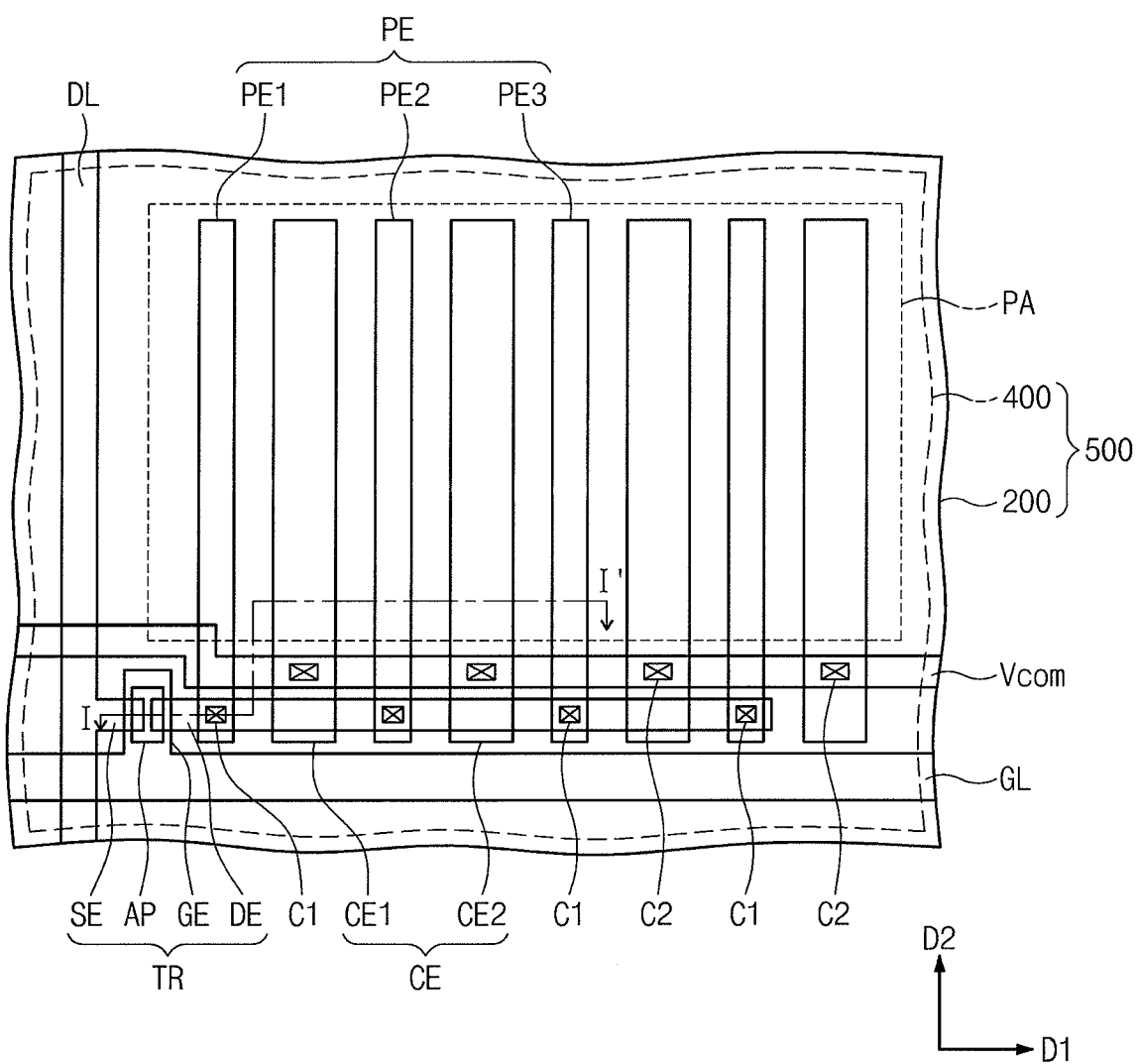
FIG. 1 is a plan view representing an exemplary embodiment of a liquid crystal display according to the present invention.

Hereinafter, embodiments of the present invention will be explained in detail with reference to the accompanying drawings. However, the scope of the present invention is not limited to such embodiments and the present invention may be realized in various forms. Embodiments described below are provided to assist those skilled in the art to completely understand the present invention. The present invention is defined only by the scope of the appended claims. In addition, the size of layers and regions shown in the drawings may not be to scale. Also, the same reference numerals are used to designate the same elements throughout the drawings.

FIG. 1 is a plan view representing an exemplary embodiment of a liquid crystal display according to the present invention.

Referring to FIG. 1, a liquid crystal display 500 includes an array substrate 200, a color filter substrate 400 facing the array substrate 200, and liquid crystal molecules 250 (shown in FIG. 2) disposed therebetween.

A pixel area PA is defined on the array substrate 200; the size and shape of the pixel area PA is not limited to embodiments described herein. The array substrate 200 includes a gate line GL, a common voltage line Vcom, a data line DL, a thin film transistor TR, pixel electrodes PE, and common electrodes CE.

The gate line GL extends in a first direction D1. Gate signals are transmitted to the thin film transistor TR through the gate line GL. The data line DL extends in a second direction D2 substantially perpendicular to the first direction D1. The data line DL is used to transmit data signals. When the thin film transistor TR is turned on, the data signals are transmitted to the pixel electrode PE through the thin film transistor TR.

The common voltage line Vcom is spaced apart from the gate line GL and extends in the first direction to transmit a common voltage. The common voltage line Vcom is electrically connected to the common electrodes CE through second contact holes C2, so that the common voltage is provided to the common electrodes CE.

The thin film transistor TR includes a gate electrode GE branching from the gate line GL, a source electrode SE branching from the data line DL, a drain electrode DE spaced apart from the source electrode SE and an active pattern AP including semiconductor material. The drain electrode DE is electrically connected to the pixel electrode PE through a first contact hole C1. The thin film transistor TR is turned on by the gate signal to switch the data signal connected to the pixel electrode PE.

The pixel electrode PE includes a first pixel electrode PE1, a second pixel electrode PE2 and a third pixel electrode PE3. The first pixel electrode PE1, the second pixel electrode PE2 and the third pixel electrode PE3 are spaced apart from each other and extend in the second direction D2. In addition, the common electrodes CE include a first common electrode CE1 and a second common electrode CE2. The first common electrode CE1 and the second common electrode CE2 are spaced apart from each other and extend in the second direction D2.

The pixel electrodes PE are alternately provided with the common electrodes CE. For example, the first common electrode CE1 is disposed between the first pixel electrode PE1 and the second pixel electrode PE2, and the second common electrode CE2 is disposed between the second pixel electrode PE2 and the third pixel electrode PE3.

According to an exemplary embodiment of the present invention, the pixel electrodes PE are spaced apart from each other, and each of the pixel electrodes PE is electrically connected to the drain electrode DE at the first contact holes C1. For example, the first pixel electrode PE1, the second pixel electrode PE2 and the third pixel electrode PE3 are spaced apart from each other and are electrically connected to the drain electrode DE through the first contact holes C1. Each of the pixel electrodes PE may branch from a main part (not shown) of the pixel electrode. In an exemplary embodiment where each of the pixel electrodes PE branches from the main part of the pixel electrode, branches of the pixel electrodes PE are electrically connected to the drain electrode DE through the main part of the pixel electrode.

In addition, according to an exemplary embodiment of the present invention, the common electrodes CE are spaced apart from each other, and each of the common electrodes CE is electrically connected to the common voltage line Vcom through the second contact holes C2. Each of the common electrodes CE may branch from a main part (not shown) of the common electrode. In an exemplary embodiment where each of the common electrodes CE branches from the main part of the common electrode, branches of the common electrodes CE are electrically connected to the common voltage line Vcom through the main part of the common electrode.

In addition, according to an exemplary embodiment of the present invention, the pixel electrodes PE and the common electrodes CE extend in the second direction D2. However, the pixel electrode PE and the common electrode CE may extend in the first direction D1, or the pixel electrode PE and the common electrode CE may extend in the first direction D1 and the second direction D2, respectively.

First protrusions 135 (shown in FIG. 2) and second protrusions 138 (shown in FIG. 2) are provided in the pixel area PA. The common electrodes CE are formed on the first protrusions in one-to-one relationship. The pixel electrodes PE are formed on the second protrusions in one-to-one relationship. Details of the first and second protrusions will be described with reference to FIG. 2.

FIG. 2 is a sectional view taken along line I-I' shown in FIG. 1.

As shown in FIG. 2, the array substrate 200 includes a first substrate 100, a gate insulating layer 110, an organic layer 120, the first protrusions 135, the second protrusions 138 and an interlayer dielectric layer 130 in addition to the elements shown in FIG. 1.

The gate insulating layer 110 is provided on the first substrate 100 and covers the gate electrode GE and the common voltage line Vcom. In addition, the organic layer 120 is provided on the gate insulating layer 110 in the pixel area PA. A concavo-convex pattern is formed on the organic layer 120, and the concavo-convex pattern is defined by the first protrusions 135 and the second protrusions 138 that protrude from the organic layer 120. The first protrusions 135 and the second protrusions 138 are alternately and repeatedly protruding from the organic layer 120.

The common electrodes CE are provided on the first protrusions 135 in one-to-one relationship. Each of the first protrusions 135 is defined by a first side part 133, an upper part 132 and a first opposite side part 131 facing the first side part 133. Each of the first common electrode CE1 and the second common electrode CE2 is provided on the first side part 133, the upper part 132 and the first opposite side part 131.

The interlayer dielectric layer 130 is provided on the first common electrode CE1, the second common electrode CE2 and the thin film transistor TR. The interlayer dielectric layer 130 is partially removed at the first contact hole C1 such that the first pixel electrode PE1 is electrically connected to the drain electrode DE.

The pixel electrodes PE are provided on the second protrusions 138 in one-to-one relationship. The second pixel electrode PE2 and the third pixel electrode PE3 are provided on a second side part 136 of the second protrusion 138, which faces the first side part 133 wherein the interlayer dielectric layer 130 interposes therebetween. A part of the first common electrode CE1 formed on the first side part 133 faces the second pixel electrode PE2 formed on the second side part 136, so that a lateral electrical field is generated between the first common electrode CE1 and the second pixel electrode PE2. Similarly, the lateral electric field is generated between the second common electrode CE2 and the third pixel electrode PE3.

The color filter substrate 400 includes a second substrate 300, a black matrix BM and a color filter CF. The black matrix BM is provided on the second substrate 300. In addition, the color filter CF is provided on the second substrate 300. The color filter CF may overlap with the black matrix BM.

According to an exemplary embodiment of the present invention, the liquid crystal material has positive dielectric anisotropy. Accordingly, when the electric field exerts an influence on the liquid crystal molecules 250, an alignment of the liquid crystal molecules 250 is twisted to be substantially parallel to a direction of the electric field. In addition, when the electric field is not generated between the common electrode CE and the pixel electrode PE, the liquid crystal molecules 250 are aligned substantially perpendicularly to the first substrate 100. To align the liquid crystal molecules 250 substantially perpendicularly to the first substrate 100 when the electric field is not generated, alignment layers (not shown in FIG. 2) may be provided on the outermost layers of the array substrate 200 and the color filter substrate 400, respectively. A rubbing treatment for the alignment layers may not be needed when the liquid crystal molecules 250 are substantially vertically aligned to the first substrate 100 when the electric field is not generated.

Figure 3A:
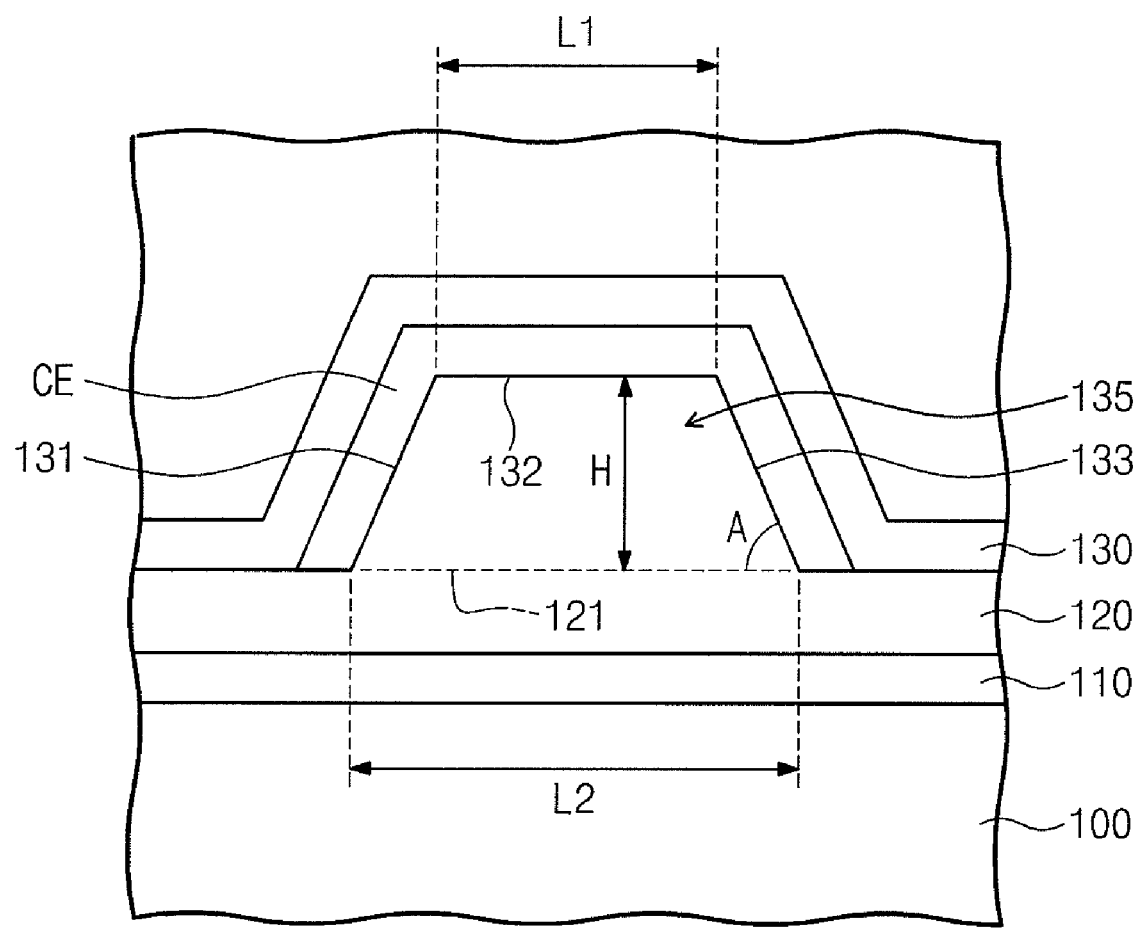
FIG. 3A is an enlarged view representing a first protrusion shown in FIG. 2.
Figure 3B:
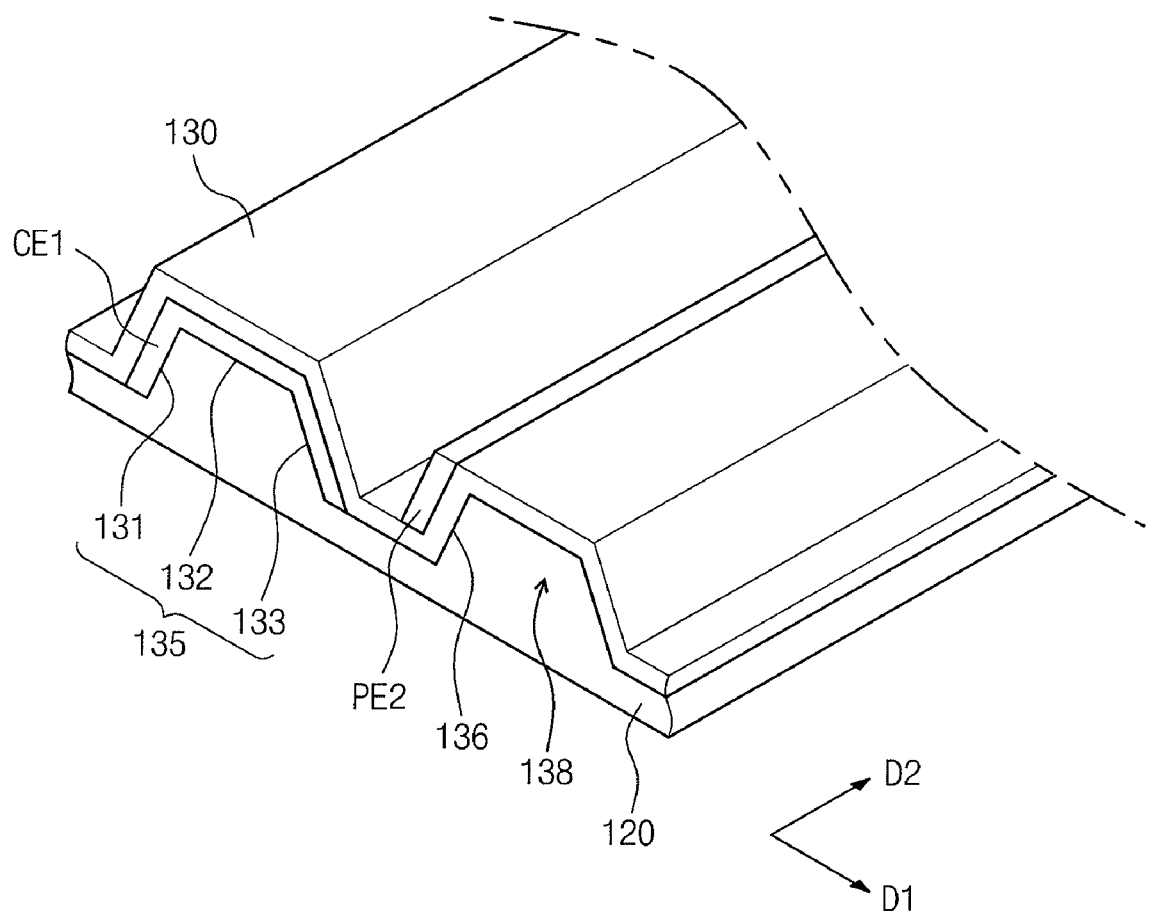
FIG. 3B is an enlarged view representing a first protrusion and a second protrusion shown in FIG. 2.

FIG. 3A is an enlarged view representing the first protrusion 135 shown in FIG. 2, and FIG. 3B is a perspective view representing the first protrusion 135 and the second protrusion 138 shown in FIG. 2.

As shown in FIGS. 3A and 3B, the first protrusion 135 and the second protrusion 138 protrude from the organic layer 120. The first protrusion 135 and the second protrusion 138 extend in the second direction D2. The first side part 133, the upper part 132, and the first opposite side part 131 of the first protrusion 135 and the second side part 136 of the second protrusion 138 extend in the second direction D2.

A height (H) of the first protrusion 135 is a distance from a bottom part 121 to the upper part 132 of the first protrusion 135. The height (H) is about 1 μm (micrometer) to about 3 μm. A width of the upper part 132 corresponding to a first length L1 is about 2 μm to about 5 μm, and a width of the bottom part 121 corresponding to a second length L2 is about 4 μM to about 15 μM.

The first side part 133 and the first opposite side part 131 are inclined with respect to the bottom part 121. The bottom part 121 forms an angle (A) of about 45 degrees to about 60 degrees with respect to the first side part 133 or the first opposite side part 131.

The second protrusion 138 has a shape substantially identical to that of the first protrusion 135. Accordingly, an upper part and a bottom part of the second protrusion 138 have lengths substantially identical to the first length L1 and the second length L2, respectively. An angle between the second side part 136 of the second protrusion 138 and a bottom part of the second protrusion 138 is substantially identical to the angle (A).

Figure 4:
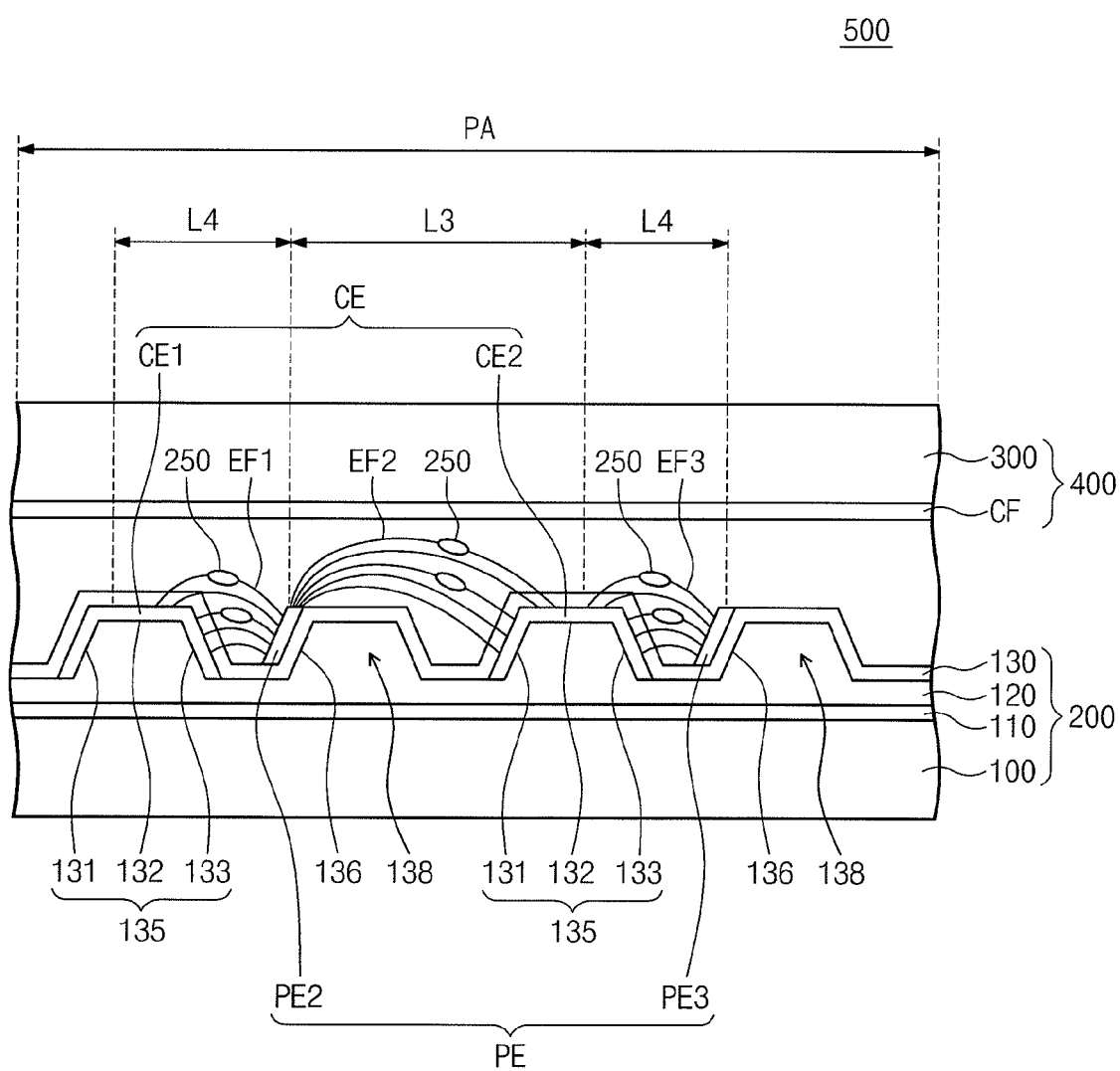
FIG. 4 is a view representing liquid crystal molecules in a case that electric field is generated between a common electrode and a pixel electrode.

FIG. 4 is a view representing liquid crystal molecules when an electric field is generated between the common electrodes and the pixel electrodes.

As shown in FIG. 4, a first electric field EF1 is generated between the first common electrode CE1 and the second pixel electrode PE2, a second electric field EF2 is generated between the second pixel electrode PE2 and the second common electrode CE2, and a third electric field EF3 is generated between the second common electric field CE2 and the third pixel electrode PE3.

The first electric field EF1, the second electric field EF2 and the third electric field EF3 have a direction which is substantially parallel to the first substrate 100. Since the liquid crystals 250 have positive dielectric anisotropy, the liquid crystal molecules 250 are aligned corresponding to the first to third electric fields EF1, EF2 and EF3 such that the director of the liquid crystals 250 is substantially parallel to the direction of the first to third electric fields EF1, EF2 and EF3.

The second electric field EF2 is formed between the second pixel electrode PE2 and the second common electrode CE2 that is spaced apart from the second pixel electrode PE2 by a third length L3. The first electric field EF1 is formed between the first common electrode CE1 and the second pixel electrode PE2 that is spaced apart from the first common electrode CE1 by a fourth length L4, which is smaller than the third length L3. The third electric field EF3 is formed between the second common electrode CE2 and the third pixel electrode PE3 that is spaced apart from the second common electrode CE2 by the fourth length L4. Since intensity of the electric field may become smaller as a distance between electrodes increases, the intensity of the first electric field EF1 and the third electric field EF3 is greater than that of the second electric field EF2.

As shown in FIG. 1, the first common electrode CE1 and the second common electrode CE2 are electrically connected to the common voltage line Vcom (shown in FIG. 1) to receive common voltages having the same level, and the second pixel electrode PE2 and the third pixel electrode PE3 are electrically connected to the drain electrode (DE, shown in FIG. 1) to receive pixel voltages having the same level. Accordingly, the first to third electric fields EF1, EF2 and EF3 are generated by the same potential difference. The position of the electrodes generating the second electric field EF2 is opposite to the electrodes generating the first and third electric fields EF1 and EF3, and a direction of the first electric field EF1 and the third electric field EF3 is different from that of the second electric field EF2.

The first electric field EF1 and the third electric field EF3 have intensity greater than that of the second electric field EF2, so that control failure of the liquid crystal molecules 250 disposed at the boundary of the electric fields caused by adjacent electric fields, which are substantially symmetrically spread with substantially the same intensity, can be minimized.

The first electric field EF1 and the third electric field EF3 have intensity greater than that of the second electric EF2, and the direction of overall electric fields generated is the substantially same as that of the first electric field EF1 or the third electric field EF3. For a partially generated vertical electric field, which allows the liquid crystal molecules 250 to be aligned perpendicularly to the first substrate 100, the liquid crystal molecules 250 may tend to be aligned according to the direction defined by the overall electric field, rather than the vertical electric field. Accordingly, the liquid crystal molecules 250 subject to the vertical electric field can be aligned in substantially the same direction as an alignment direction of the liquid crystal molecules 250 aligned by the overall electric field. As a result, a size of an area in the pixel area in which the liquid crystal molecules 250 are not controlled due to the vertical electric field can be reduced and light leakage may be substantially prevented from occurring in the liquid crystal display 500.

Figure 5:
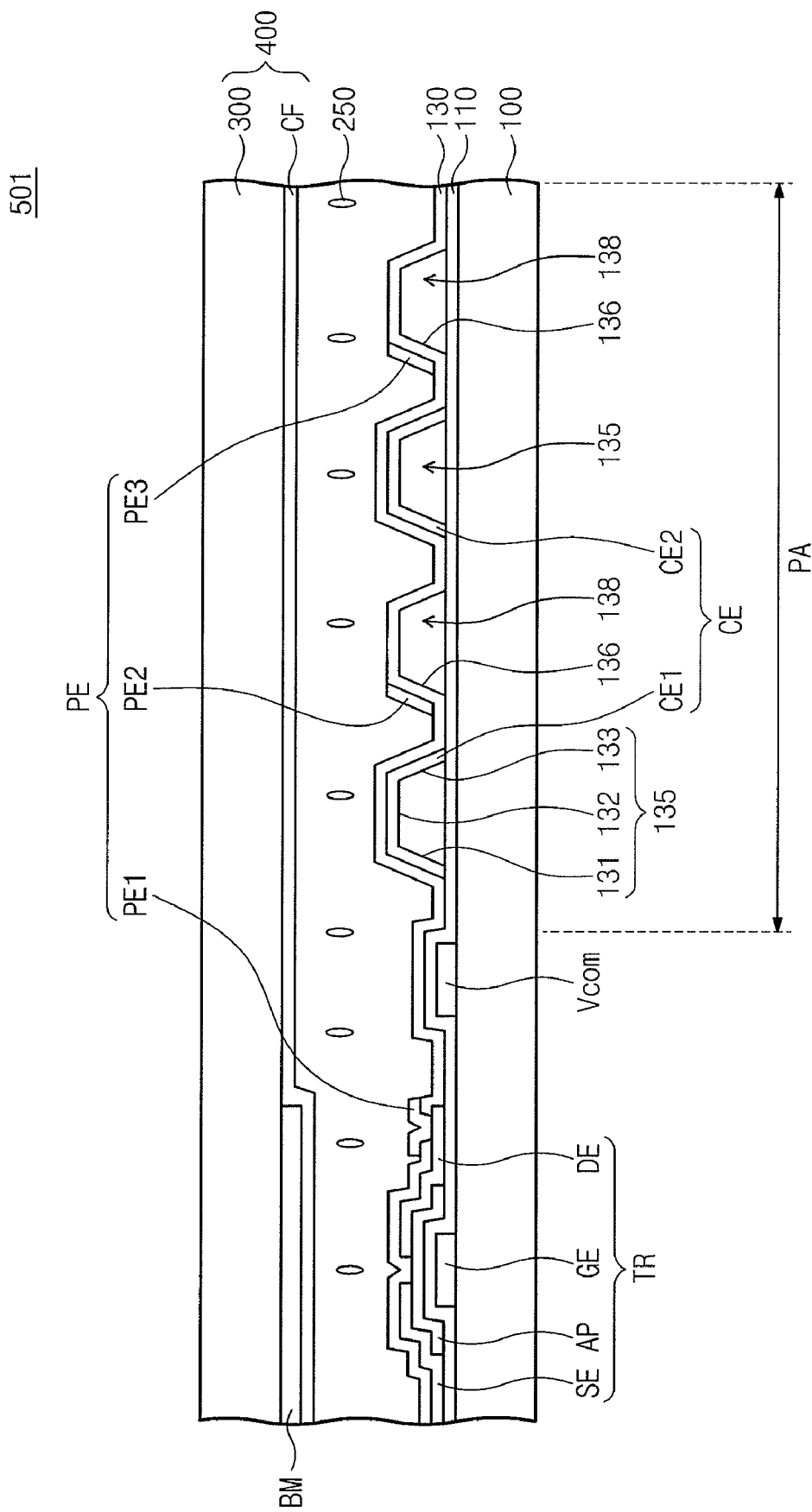
FIG. 5 is a sectional view representing another exemplary embodiment of a liquid crystal display according to the present invention.

FIG. 5 is a sectional view representing another exemplary embodiment of a liquid crystal display according to the present invention. In the following description, the same reference numerals will be assigned to the same elements and the details of the same elements will be omitted in order to avoid redundancy.

Referring to FIG. 5, a liquid crystal display 501 includes first protrusions 135 and second protrusions 138 on a gate insulating layer 110.

According to an exemplary embodiment of the present invention, the first protrusions 135 and the second protrusions 138 can be directly formed on the gate insulating layer 110.

FIGS. 6 to 11 are views representing an exemplary process of manufacturing the liquid crystal display shown in FIG. 1.

Figure 6:
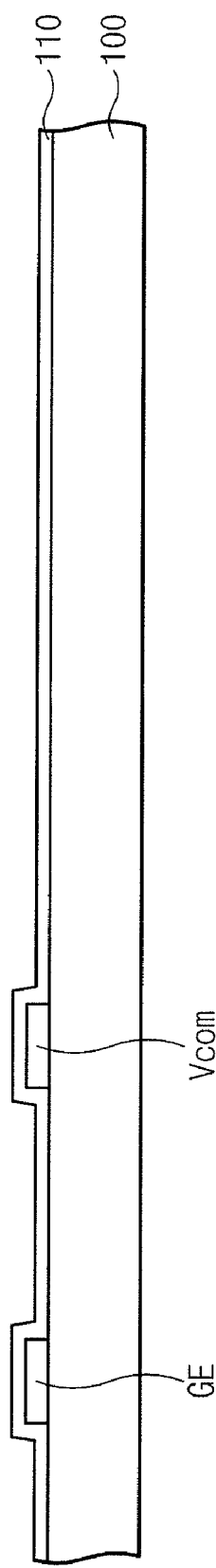

As shown in FIG. 6, the gate electrode GE and the common voltage line Vcom are formed on the first substrate 100. In more detail, a metal film (not shown) may be formed on the first substrate 100 and patterned, thereby simultaneously forming the gate electrode GE and the common voltage line Vcom.

After the gate electrode GE and the common voltage line Vcom have been formed, the gate insulating layer 110 may be formed on the gate electrode GE and the common voltage line Vcom.

Figure 7:
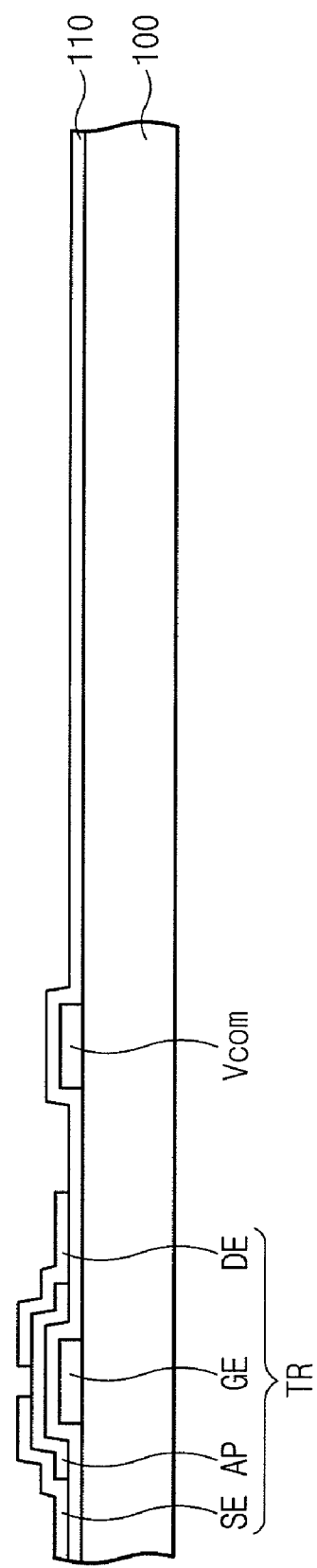

As shown in FIG. 7, the active pattern AP, the source electrode SE and the drain electrode DE are formed on the gate insulating layer 110. As a result, the thin film transistor TR including the gate electrode GE, the active pattern AP, the source electrode SE and the drain electrode DE is formed.

As shown in FIG. 8, a preliminary organic layer 121 may be formed on the first substrate 100 and the gate insulating layer 110. According to an exemplary embodiment, the preliminary organic layer 121 includes a photoresist organic material. In more detail, the preliminary organic layer 121 includes material having positive photoresist property.

After the preliminary organic layer 121 has been formed, a slit mask 260 may be disposed above the first substrate 100. The slit mask 260 includes a transmitting part 261, a semi-transmitting part 262 and a light blocking part 263. The semi-transmitting part 262 and the light blocking part 263 are alternately disposed.

After the slit mask 260 has been disposed above the preliminary organic layer 121, light is radiated from an upper part of the slit mask 260 to be transmitted to the preliminary organic layer 121 through the slit mask 260.

As shown in FIG. 9, after the preliminary organic layer 121 (shown in FIG. 8) has been subject to the exposure process using the slit mask 260 (shown in FIG. 8), the preliminary organic layer is developed. As a result, the organic layer 120 and the first protrusions 135 and the second protrusions 138 protruding from the organic layer 120 are formed.

As shown in FIG. 8, since the preliminary organic layer 121 includes positive photoresist material, a portion of the preliminary organic layer 121 corresponding to the transmitting part 261 of the slit mask 260 is completely removed, and a portion of the preliminary organic layer 121 corresponding to the light blocking part 263 remains having a first thickness of T1, and a portion of the preliminary organic layer 121 corresponding to the semi-transmitting part 262 remains having a second thickness T2 smaller than that the first thickness T1.

As shown in FIG. 10, after the organic layer 120 has been formed, the first common electrode CE1 and the second common electrode CE2 may be formed on the first protrusions 135, respectively. In more detail, each of the first common electrode CE1 and the second common electrode CE2 is formed over the first side part 133, the upper part 132 and the first opposite side part 131.

Figure 11:
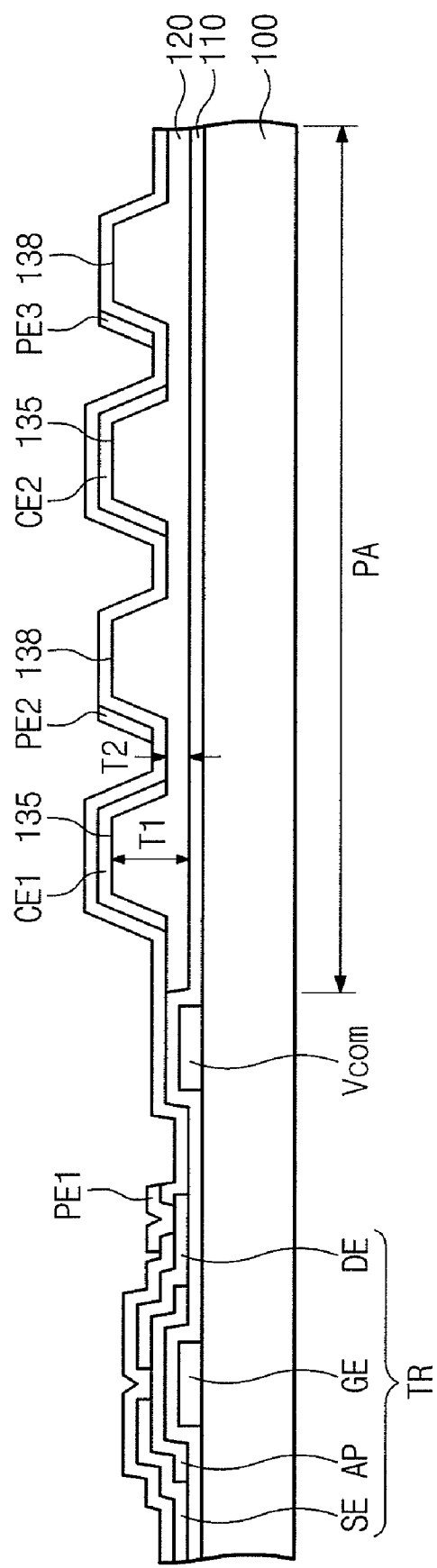

As shown in FIG. 11, the interlayer dielectric layer 130 is formed on the first substrate 100 to cover the thin film transistor TR, the first common electrode CE1 and the second common electrode CE2. The interlayer dielectric layer 130 may be partially removed to expose the drain electrode DE.

After the interlayer dielectric layer 130 has been formed, the first pixel electrode PE1, which is electrically connected to the drain electrode DE through the first contact hole C1, and the second and third pixel electrodes PE2 and PE3, which are provided on the second protrusions 138, respectively, are formed. In more detail, the second pixel electrode PE2 and the third pixel electrode PE3 are provided at the second side part 136 of the second protrusions 138.

Referring to again FIG. 2, after the first pixel electrode PE1, the second pixel electrode PE2 and the third pixel electrode PE3 have been formed, the color filter substrate 400 may be coupled to the array substrate 200, and the liquid crystal molecules 250 may be injected between the array substrate 200 and the color filter substrate 400, thereby forming the liquid crystal display 500.

As described above, the pixel electrode and the common electrode may be formed on a single substrate while facing each other, so that the lateral electric field parallel to the substrate is formed between the pixel electrode and the common electrode. Accordingly, the liquid crystal display may be operated using a liquid crystal material having positive dielectric anisotropy. In addition, although the lateral electric field includes the first electric field and the second electric field having directions different from each other, intensity of the first electric field is different from that of the second electric field. Thus, control failure of the liquid crystal material at a boundary of the electric fields caused by adjacent electric fields having same intensity and different directions may be reduced.

Although exemplary embodiments of the present invention have been described, it is understood that the present invention should not be limited thereto but various changes and modifications can be made by one ordinary skilled in the art within the spirit and scope of the present invention as hereinafter claimed.

What is claimed is:

1. A liquid crystal display comprising:
    a first substrate:
    a second substrate facing the first substrate;
    a liquid crystal material interposed between the first and second substrates;
    at least one first protrusion provided on the first substrate;
    at least one second protrusion provided on the first substrate alternating with the first protrusion;
    a common electrode provided at a first side part of the first protrusion; and
    a pixel electrode provided at a second side part of the second protrusion which faces the first side part.

2. The liquid crystal display of claim 1, wherein the common electrode extends from the first side part of the first protrusion to an upper part and an opposite side part of the first side part.

3. The liquid crystal display of claim 1, wherein the first side part is inclined with respect to a bottom of the first protrusion, and the second side part is inclined with respect to a bottom of the second protrusion.

4. The liquid crystal display of claim 3, wherein the first protrusion and the second protrusion have a height of about 1 micrometer to about 3 micrometers.

5. The liquid crystal display of claim 1, further comprising:
    a common voltage line provided on the first substrate and electrically connected to the common electrode to provide a common voltage to the common electrode;
    a gate line provided on the first substrate to transmit a gate signal;
    a data line provided on the first substrate for transmitting a data signal, the data line being insulated from the gate line; and
    a thin film transistor electrically connected to the pixel electrode and controlled by the gate signal to switch the data signal provided to the pixel electrode.

6. The liquid crystal display of claim 5, wherein the gate line crosses the data line, and the first protrusion and the second protrusion extend substantially parallel to at least one of the gate line and the data line when viewed in a plan view.

7. The liquid crystal display of claim 1, further comprising an insulating layer disposed between the first protrusion and the first substrate and between the second protrusion and the first substrate to cover the first substrate, wherein the first protrusion and the second protrusion protrude from the insulating layer.

8. The liquid crystal display of claim 7, wherein the insulating layer, the first protrusion and the second protrusion comprise an organic material.

9. The liquid crystal display of claim 1, wherein the liquid crystal has a positive dielectric anisotropy.

10. A method of manufacturing a liquid crystal display, the method comprising:
   forming at least one first protrusion on a first substrate;
   forming at least one second protrusion that is alternately disposed with the first protrusion on the first substrate;
   forming a common electrode at a first side of the first protrusion;
   forming a pixel electrode at a second side of the second protrusion that faces the first side;
   coupling the first substrate to the second substrate; and
   disposing a liquid crystal material between the first substrate and the second substrate.

11. The method of claim 10, wherein the common electrode extends from the first side part of the first protrusion to an upper part and a side part, which is opposite to the first side part.

12. The method of claim 10, wherein the first side part is inclined with respect to a bottom of the first protrusion, and the second side part is inclined with respect to a bottom of the second protrusion.

13. The method of claim 12, wherein the first protrusion and the second protrusion have a height of about 1 micrometer to about 3 micrometers.

14. The method of claim 10, further comprising:
   forming a common voltage line on the first substrate and electrically connected to the common electrode to provide common voltage to the common electrode;
   forming a gate line on the first substrate to transmit a gate signal;
   forming a data line on the first substrate to transmit a data signal, the data line being insulated from the gate line; and
   forming a thin film transistor electrically connected to the pixel electrode and controlled by the gate signal to switch the data signal provided to the pixel electrode.

15. The method of claim 14, wherein the gate line crosses the data line, and the first protrusion and the second protrusion extend substantially parallel to at least one of the gate line and the data line when viewed in a plan view.

16. The method of claim 10, wherein the first protrusion and the second protrusion are formed by patterning a preliminary insulating layer formed on the first substrate, such that the preliminary insulating layer has a first thickness and a second thickness larger than the first thickness, and the first protrusion and the second protrusion correspond to a portion of the preliminary having the second thickness.

17. The method of claim 16, wherein the preliminary layer, the first protrusion, and the second protrusion comprise an organic material.

18. The method of claim 16, wherein the preliminary insulating layer is patterned using a slit mask.

19. The method of claim 10, wherein the liquid crystal has a positive dielectric anisotropy.

* * * * *